United States Patent

Kindell et al.

[15] 3,699,326

[45] Oct. 17, 1972

[54] ROUNDING NUMBERS EXPRESSED IN 2'S COMPLEMENT NOTATION

[72] Inventors: Jerry L. Kindell, Phoenix; Leonard G. Trubisky, Scottsdale, both of Ariz.

[73] Assignee: Honeywell Information Systems Inc., Waltham, Mass.

[22] Filed: May 5, 1971

[21] Appl. No.: 140,437

[52] U.S. Cl. ....................235/175, 235/164, 235/176

[51] Int. Cl. ..................................................G06f 7/38

[58] Field of Search ...............235/175, 176, 168, 164

[56] References Cited

UNITED STATES PATENTS

| | | | |
|---|---|---|---|
| 3,290,493 | 12/1966 | Githens, Jr. et al | 235/164 |
| 3,509,330 | 4/1970 | Batte | 235/175 |

OTHER PUBLICATIONS

R. K. Richards, Arithmetic Operations in Digital Computers, 1955, pp. 174–176

*Primary Examiner*—Charles E. Atkinson
*Assistant Examiner*—David H. Malzahn
*Attorney*—Fred Jacob and Edward W. Hughes

[57] ABSTRACT

Rounding apparatus is disclosed which provides consistent rounding of positive and negative numbers in 2's complement representation for floating point operations on binary digital computers. In the disclosed embodiment of the invention, a general purpose computer is described in which apparatus is provided for performing the normal arithmetic and logical operations required for data processing. The computer is augmented by additional apparatus for modifying floating point operands so that consistent results are obtained in processing both positive and negative numbers, primarily during store operations.

6 Claims, 3 Drawing Figures

ROUNDING NUMBERS EXPRESSED IN 2'S COMPLEMENT NOTATION

BACKGROUND OF THE INVENTION

In processing numerical data on digital computers, particularly for scientific applications, the computer represents data by the best approximation it can make with the number of bits available. For example, with 36 bit words, a number may be represented by an 8 bit exponent and a 28 bit mantissa or fraction for a single precision floating point data type. If a double word data type is used, the mantissa is extended 36 bits to 64 bits. For some numbers, 0.5 for example, the number can be represented exactly as 000000000 100··· in binary floating point representation. In general, however, the representation is an approximation. For example, the number ⅓ cannot be represented exactly with a radix of 2. This problem exists in addition to the fact that many values have always required approximation in numerical analysis including irrational numbers, transcendental numbers, etc. More important, for the purposes of this invention, is that computers performing a series of arithmetic operations including multiplications and divisions tend to gradually lose precision. In general, numbers represented by *n* bits when multiplied produce 2 *n* bits of significance. When the result is stored, it must be reduced to *n* bits and a determination of whether to make the least significant bit stored a 1 or a 0 must be made. Probably the most common practice is to simply truncate the result, ignoring the bits beyond the *n* bits of significance allowed by the data type prescribed for the operand.

Particularly for single precision variables, truncation can lead to unacceptable final results from a series of computations which give consistently positive or negative intermediate results, such as is often the case in mathematical programming, for example. For any given processing structure and a given number of bits of significance, there is a limit on the accuracy which can be maintained. For some cases this accuracy will be insufficient and special programming procedures are then required for those cases. Accordingly, the general goal is to organize the data processing structure so that truncation and round-off errors tend to cancel out. Experience has shown that for most applications the best results are obtained by rounding to the nearest value that can be represented.

For binary computers, one approach to round-off is to add a one to the first bit position to be lost and propagate a carry if that bit is a 1 and then truncate the remaining bits. However, it has been found that any arrangement which produces the same effect on the last bit for both negative and positive numbers will result in inconsistent results. For the case where the computer generates two results of identical magnitude and opposite sign, and the bits following the *n* bits stored consist of a first 1 followed by all 0's, the magnitude of the stored result is different. If either truncation or a carry-in is performed on both results, the sum of the two stored results is nonzero. This is because truncation of a 2's complement number decreases the magnitude of a positive number but increases the magnitude of a negative number and vice versa for a carry-in.

Another consideration is that in computers of the type disclosed herein, rounding of any kind can reduce the accuracy of a series of computations. That is, if the accumulator is rounded, subsequent operations modifying the accumulator will be correspondingly less accurate.

Accordingly, it is an object of the invention to provide apparatus for rounded 2's complement numbers which produces consistent results for both positive and negative numbers.

It is a further object of the invention to provide apparatus for storing rounded 2's complement numbers into a computer memory without losing significance in the accumulator.

SUMMARY OF THE INVENTION

In a binary computer with 2's complement representation of floating point numbers, apparatus is provided which rounds numbers for storage in such a manner that the stored results of positive and negative numbers is the same for numbers of identical magnitude in all cases. Where n bits of significance are lost due to storage word length limitations, a rounding constant $2^{n-1}—\alpha 1$, that is, a zero followed by all 1's, is added to the *n* least significant bits of the accumulator, and carry propagation allowed. If the accumulator contains a positive number, a carry-in is added to the least significant bit of the adder so that for floating point numbers to be stored, the number stored is rounded up in magnitude if the accumulator value is exactly midway between adjacent values which can be represented in the stored format or greater in magnitude. Otherwise, the stored number is a truncated version of the accumulator value. Normally the accumulator itself remains unchanged so that the maximum significance is maintained over a series of calculations.

A SPECIFIC EMBODIMENT OF THE INVENTION

Figure 1:
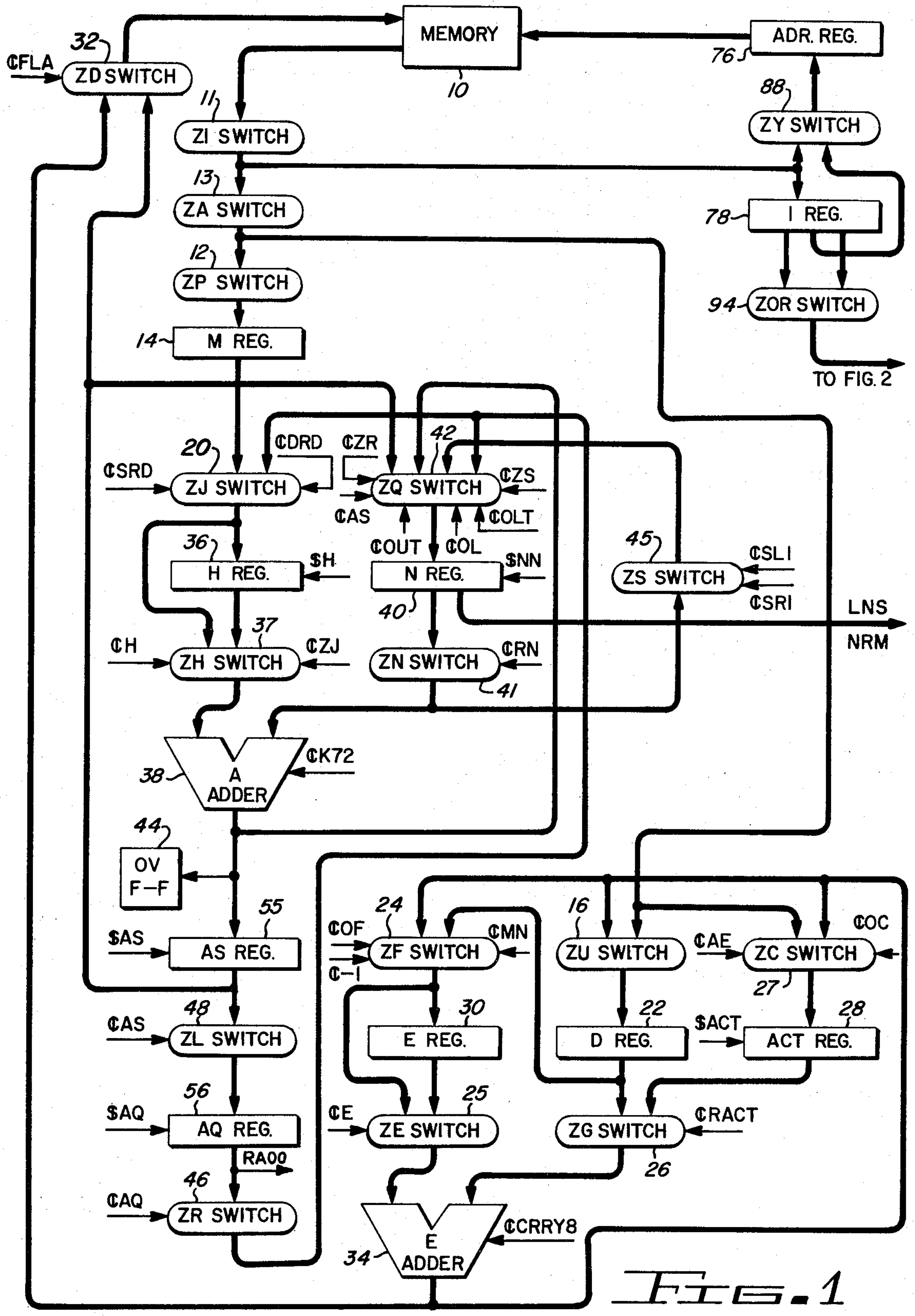
FIG. 1 is a block diagram of a preferred embodiment of the invention, illustrating registers, switches and adders constituting an operations unit for a binary, 2's complement, digital computer.

FIG. 1 illustrates the major components required for the arithmetic unit and interconnections for implementing the present invention in a preferred embodiment. For a more complete description of the data processing system, reference is made to U.S. Pat. No. 3,413,613, "Reconfigurable Data Processing System," D. L. Bahrs et al., issued Nov. 26, 1968.

A main memory 10 directs data words and instruction words through ZI switch 11 to ZY switch 88, instruction I register 78, and ZA switch 13. A pair of data words is gated by the ZA switch 13 and ZP switch 12 to a 72 bit M register 14. ZJ switch 20 selectively connects data words from the M register to a 72 bit H register 36, one of the pair of operand registers for the main A adder 38. The second operand register is a 72 bit N register 40 which is loaded from ZQ switch 42. The A adder is a 72 bit full adder which performs selectively the arithmetic operations of addition and subtraction on 2's complement numbers and the logical operations of OR, AND, and exclusive OR. The inputs to the A adder are selected by ZH gate 37, having as one first operand input the H register 36, and by ZN gate 41, having as one second operand input the N register 40. The output of the A adder is stored in a 72 bit AS register 55 or can be selectively gated to the N register by ZQ switch 42. The contents of the AS register are selectively gated for storage in memory or a 72 bit accumulator, AQ register 56, by ZD switch 32 and ZL switch 48, respectively. Through ZR switch 46, the accumulator contents are selectively gated to the H or N registers by ZJ switch 20 and ZQ switch 42.

Exponent portions of words from the memory 10 which pass through ZI switch 11 are also selectively gated, right justified, to a 10 bit D register 22 by ZU switch 16, for the purpose of separating an exponent from a floating point number or gated to a 10 bit ACT register 28 by ZC switch 27, for the purpose of maintaining shift counts and the like. An exponent E adder 34 is provided for performing exponent processing and auxiliary functions. Inputs to the exponent adder are taken from ZE switch 25 and ZG switch 26. The output of the exponent adder is connected to ZF switch 24, ZU switch 16, and ZC switch 27. The ZF switch gates operands from the D register and exponent adder outputs to an E register 30.

The apparatus shown in FIG. 1 consists of a combination of switches, registers and adders. The particular implementation of these devices is not material to the present invention. To implement the A adder 38 it is sufficient to use 72 full adders, each adder having as inputs a bit from the corresponding bit position in each operand applied thereto and a carry-in from the next less significant full adder. The least significant full adder is adapted to receive a 1 or a 0 as a carry-in in accordance with the gating signals. The sum outputs of the full adders serve as adder outputs for the respective bit positions and the carry-out outputs of the full adders provide carry-in inputs for the next m most significant full adder. The most significant full adder's carry-out output is connected to an adder carry-out flip-flop. Also, logic is included to detect overflow which sets OV flip-flop 44. In practice, the simple adder as just described is preferably modified to reduce carry propagation time by carry-look-ahead logic, conditional sum logic, etc., in accordance with the desired processor performance. The registers are conveniently DC gated by control signals. The switches are comprised of a set of parallel logic gate stages such as the first stage of ZQ switch 42 shown in FIG. 3. For the selectable inputs, AND gates 301, 302, 303, 304 are provided for the inputs from the shifter ZS switch 45, A adder 38, ZR switch 46, and a permanent zero respectively. These inputs are gated by applying the respective control signals ¢ZS, ¢A, ¢ZR, and ¢0. The outputs of these AND gates are ORed together by NOR gate 306, the output of which is inverted by NAND gate 307.

Figures 2, 3:
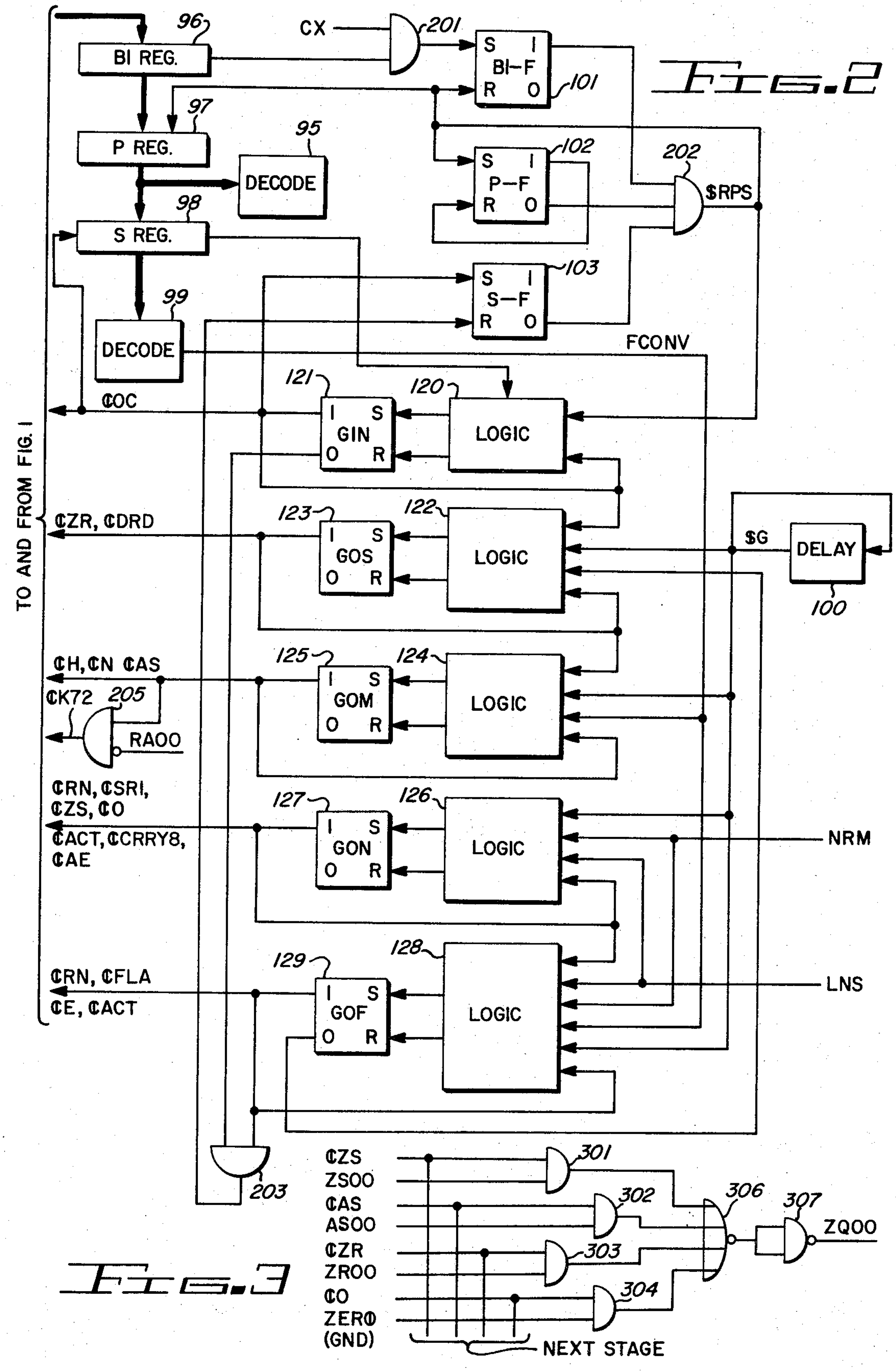
FIG. 2 is a block diagram of logic elements constituting a control unit for the operations unit of FIG. 1.
FIG. 3 is a logic diagram of an implementation of a representative switch for the FIG. 1 operations unit.

FIG. 2 includes the major components providing a control unit which decodes operation codes, initiates and terminates machine cycles, and generates various control signals. From the instruction I register 78 of FIG. 1, the operation code portions of the instructions, namely bits 18–26 or 54–62, are selectively switched into a buffer B1 register 96 by ZOR switch 94. The B1 register provides an input to a P register 97 which in turn provides an input to S register 98 and decode network 95. The B1 register also generates a signal B1-FULL, indicating it has been loaded from the I register, which sets a B1 flag flip-flop 101, when clocked by a CX clock in AND gate 201. This flip-flop in turn sets a P flag flip-flop 102, which resets the B1 flag flip-flop and initiates a preliminary operation cycle GIN by setting a GIN RS flip-flop 121, during which the instruction set up occurs and the contents of the B1 register are transferred to the P register. The setting of the GIN flip-flop 121 causes the contents of the P register to be transferred to the S register, which in turn causes the S flag flip-flop 103 to be set and provides the input to operation decode network 99.

In general, machine operating cycles are delimited by a $G clock signal from a clock generator 100. This generator incorporates a feedback path and a delay element, such as a shift register, and with the provision of variable delay, the duration of each machine cycle can be minimized for maximized instruction execution efficiency.

During the first machine cycle of instruction execution, GOS, the operand is shifted from the accumulator AQ register to the operand N register. The control signal for this cycle is provided by the GOS RS flip-flop 123 being in the set state. The logic 122 controls the GOS flip-flop as follows:

$$\text{set GOS} = \$G \cdot \text{GIN} \cdot \overline{\text{set GOF}}$$

$$\text{reset GOS} = \$G \cdot \text{GOS}$$

After the N register operand is set up, the actual rounding is performed during the GOM cycle. The control signal for this cycle is provided by the GOM RS flip-flop 125 which is controlled by logic 124 as follows:

$$\text{set GOM} = \$G \cdot \text{GOS} \cdot \text{FCONV}$$

$$\text{reset GOM} = \$G \cdot \text{GOM} \cdot \text{FCONV}$$

The FCONV signal is provided by the decode network 99. The carry-in signal is provided by AND gate 205 if the sign of the operand, RSOO, is positive.

In order to provide the greatest possible accuracy in the rounded operand, it is desirable to provide a normalizing cycle after rounding by a GON cycle. The control signal for this cycle is provided by the GON RS flip-flop 127, which is controlled by logic 126 as follows:

$$\text{set GON} = \$G \cdot \text{NRM}$$

$$\text{reset GON} = \$G \cdot \text{GON} \cdot \text{LNS}$$

The NRM signal, indicating that normalizing is called for, is provided by examination of the sign bit and the adjacent bit in the rounded result in the N register. If these are the same, either 11 or 00, normalization can be performed ($\text{NRM} = \overline{\text{RNOO} \oplus \text{RNO1}}$). Normalization proceeds until this condition changes. The change is anticipated by examining the second and third bits ($\text{LNS} = \text{NRM} \cdot (\overline{\text{RN01} \oplus \text{RNO 2}})$). The time required for normalization is variable, depending on the number of arithmetic shifts required.

For decreasing the time for normalization, it is preferable to use multiple bit shift operations. Such shift operations are implemented by the ZS switch 45 having the capability of providing left arithmetic shifts (not affecting the sign bit) of four and sixteen bit positions and by logic for examining the operand for whether or not four and sixteen bit shifts can be used. However, whenever the original operand is normalized before rounding, normalization considerations arise only when the rounded result is 1.100···0. For this case, only a single shift is called for.

During the last machine cycle of instruction execution, GOF, the rounded operand is stored in memory or returned to the originating register. The control signal for this cycle is provided by the GOF RS flip-flop 129 being in the set state. The logic 128 controls the GOF flip-flop as follows:

$$\text{set GOF} = \$G \cdot [\text{GOM} \cdot \text{FCONV} \cdot \overline{\text{NRM}} + \text{GON} \cdot \text{LNS}]$$

$$\text{reset GOF} = \$G \cdot \text{GOF}.$$

The rounding instruction for the disclosed embodiment is implemented as follows. Execution of floating store rounded is performed in five consecutive steps, after the initial GIN set-up cycles, which are respectively enabled by the control signals GOS, GOM, GON, and GOF from the control logic of FIG. 2. With GIN on, the control signals ¢OC and $ACT clear the ACT register. With GOS on, control signals ¢AQ, ¢ZR, and $NN respectively enable ZR switch 46, ZQ switch 42, and N register 40, in FIG. 1 to transfer the contents of AQ register 56 to the N register. Also, control signals ¢DRD and $H load the rounding constant into the H register 36. With GOM on, the contents of the N register are rounded by adding the rounding constant in the H register as the first operand for A adder 55 and the contents of the N register as the second operand, with the result returned to the N register. The control signals ¢H, ¢N, & ¢K72 respectively gate the rounding constant, the number to be stored, and the carry-in to the A adder. The last input is subject to the condition that the number to be rounded is non-negative. The output of the A adder is gated into the N register by ¢A, $NN control signals, but the bit positions in the portion of the number lost in rounding are cleared by gating signal ¢0LT which gates wired-in 0's into the eight least significant bit positions, up to the rounding point. If there is adder overflow, an OV flip-flop is set.

With control signal GON on, exponent correction and/or mantissa normalization is performed. If none is required, this step is suppressed. If the OV flip-flop is set, the contents of the N register are switched through ZS switch 43, shifted right one bit position, by gating signal ¢SR1, with the sign position filled with the complement of the previous sign bit. The shifted result is returned to the N register by control signals ¢ZS and $NN. The floating point exponent is updated by adding 1 to the ACT register 28. Gating signals ¢ZF, ¢0F, and ¢CRRY8 cause 0, and a carry-in, to be applied to the E adder 34. The output of the E adder is gated to ACT register 28 by gating signals ¢E and $ACT.

The terminating step, while GOF is on, transfers the first 64 bits of the N register to memory 10 through the last 64 bits of the ZO switch under control of ¢FLA. At the same time, the sum of the E register 30 and ACT register 28 are gated to the first eight bits of ZO switch 32 by control signals ¢E, ¢ACT, ¢FLA, unless the mantissa is zero, in which case the constant −128 is used as the exponent.

Execution of a floating point store operation for a single precision (single word) number is essentially the same as for the double precision store operation, described above. The differences consist of first, a different rounding constant is used and second, the operand store portion of the operation is adapted to the single word memory store format. The rounding constant used is, in effect, the double precision rounding constant extended. That is, 43 1's, right justified, with 29 leading 0's are obtained by applying signals ¢SRD and ¢DRD to ZJ switch 20 during GOS. The mantissa is truncated by switching signals ¢0L, ¢0LT and ¢0UT applied to the ZQ switch, also during GOM.

The floating store operation can be conveniently modified to provide rounding of the accumulator register. Although this function in most situations is undesirable because it results in a loss of information, namely the truncated bits; however, it does enable a comparison of the accumulator register with a number in memory on the basis of the same data type, and if desired the contents of the accumulator can be saved in memory. Accordingly, operations are implemented for floating round and double floating round for the accumulator register. These operations are implemented by slight modifications of the floating store round operations.

The modifications required appear only in the last stage, GOF. Instead of directing the rounded operand to memory, the rounded operand is directed to the accumulator, AQ register 56, where it originated.

While a particular embodiment of the invention has been shown and described herein, it is not intended that the invention be limited to such disclosure, but that the invention is generally applicable to digital computers processing 2's complement numbers in which it is necessary to convert a number representation to a representation having *n* less bits. For example, in a general purpose digital computer, when a double word integer number in 2's complement representation having 2*n* bits must be converted to a single word having *n* bits, the invention is directly applicable, using a rounding constant of $2^{n-1}-1$.

What is claimed is:

1. Apparatus for rounding 2's complement numbers in a binary computer to numbers having *n* less bits comprising:

A. an adder for generating the binary sum of two operands;

B. rounding means for applying the rounding number $2^{n-1}-1$ to said adder as a first operand for a negative number to be rounded;

C. rounding means for applying the rounding number $2^{n-1}$ to said adder as a first operand for a positive number to be rounded;

D. means for applying a 2's complement binary number to said adder as a second operand.

2. Apparatus for rounding 2's complement numbers in a binary computer to numbers having *n* less bits comprising:

A. an adder for generating the binary sum of two operands;

B. rounding means for applying the rounding number $2^{n-1}-1$ to said adder as a first operand;

C. means for applying a 2's complement binary number to said adder as a second operand;

D. correction means for applying a carry-in to said adder in response to a zero in the sign position of said 2's complement binary number applied to said adder.

3. The apparatus of claim 2 further comprising:

E. a register for storing said binary number applied as a second operand for said adder;

F. operand switching means, included in said means for applying a 2's complement binary number to said adder, interconnecting said register and said adder;

G. register input switching means for selectively gating said 2's complement binary number to be rounded or said adder output to said register;

H. means connecting the output of said adder to said register input switching means.

4. The apparatus of claim 3 further comprising:

I. an accumulator register connected to said register input switching means for providing said 2's complement binary number to be rounded;

J. accumulator switching means interconnecting said adder and said accumulator in such a manner that the contents of said accumulator register are selectively rounded and returned to said accumulator register.

5. The apparatus of claim 4 further comprising:

K. shift switching means, connected between said register for storing said second operand and said operand switching means, for normalizing said operand;

L. control means, responsive to said operand register, for directing a rounded operand in said operand register through said shift switching means and said operand switching means back to said operand register, until said operand is normalized.

6. In a binary computer, having the capability of processing floating point numbers in a binary 2's complement representation, apparatus for rounding such numbers to a representation having *n* less bits comprising:

A. an adder for generating the binary sum of two operands;

B. an accumulator register for storing the output of said adder;

C. first and second operand registers for storing operands;

D. first and second operand switching means connecting said first and second operand registers, respectively, to said adder;

E. an output switch for storing data words in a main memory;

F. accumulator input switching means for selectively connecting said adder to said accumulator register and said output switch;

G. accumulator output switching means for selectively connecting said accumulator register to said second operand register;

H. a rounding constant generator, connected to said first operand switching means, for applying the value $2^{n-1}-1$ as the first operand for said adder;

I. means for applying a carry-in to said adder in response to a positive sign bit in said second operand register.

* * * * *